United States Patent
Hashizume (10) Patent No.: US 11,119,004 B2
(45) Date of Patent: Sep. 14, 2021

(54) STRAIN ESTIMATION DEVICE, DIAGNOSIS DEVICE, AND STRAIN ESTIMATION METHOD

(71) Applicant: IHI Corporation, Koto-ku (JP)

(72) Inventor: Tatsuya Hashizume, Koto-ku (JP)

(73) Assignee: IHI Corporation, Koto-ku (JP)

( * ) Notice: Subject to any disclaimer, the term of this patent is extended or adjusted under 35 U.S.C. 154(b) by 274 days.

(21) Appl. No.: 16/099,357

(22) PCT Filed: Dec. 28, 2016

(86) PCT No.: PCT/JP2016/089090
§ 371 (c)(1),
(2) Date: Nov. 6, 2018

(87) PCT Pub. No.: WO2017/212671
PCT Pub. Date: Dec. 14, 2017

(65) Prior Publication Data
US 2019/0212137 A1 Jul. 11, 2019

(30) Foreign Application Priority Data

Jun. 6, 2016 (JP) .............................. JP2016-112471

(51) Int. Cl.
| *G01M 13/00* | (2019.01) |
| *G01L 1/00* | (2006.01) |
| *G01B 13/24* | (2006.01) |

(52) U.S. Cl.
CPC ............. *G01M 13/00* (2013.01); *G01B 13/24* (2013.01); *G01L 1/00* (2013.01)

(58) Field of Classification Search
CPC .................................................... G01B 13/24
See application file for complete search history.

(56) References Cited

U.S. PATENT DOCUMENTS

| 5,038,614 A | 8/1991 | Bseisu et al. |
| 6,363,789 B1 | 4/2002 | Rassaian et al. |
| (Continued) | | |

FOREIGN PATENT DOCUMENTS

| CN | 104049036 A | 9/2014 |
| JP | 62-182402 A | 8/1987 |
| (Continued) | | |

OTHER PUBLICATIONS

International Search Report dated Mar. 28, 2017 in PCT/JP2016/089090.

*Primary Examiner* — Jennifer Bahls
(74) *Attorney, Agent, or Firm* — Oblon, McClelland, Maier & Neustadt, L.L.P.

(57) ABSTRACT

A strain estimation device according to an aspect of the present disclosure is a strain estimation device that estimates strain of a component provided in a fluid and includes a pressure acquisition unit that acquires a pressure signal including time-series pressure values at a predetermined position in a vicinity of the component, an estimation unit that estimates, based on the pressure signal, a strain signal including time-series strain values occurring at the component, and an output unit that outputs the strain signal. The estimation unit converts the pressure signal into the strain signal using an estimation filter determined based on a power spectral density of pressure and a power spectral density of strain occurring at the component when the pressure is applied to the position.

3 Claims, 5 Drawing Sheets

(56) References Cited

U.S. PATENT DOCUMENTS

| | | | |
|---|---|---|---|
| 6,813,532 B2* | 11/2004 | Eryurek | G05B 23/0294 700/108 |
| 2002/0008470 A1 | 1/2002 | Uegaki et al. | |
| 2002/0010562 A1 | 1/2002 | Schleiss et al. | |
| 2002/0022894 A1 | 2/2002 | Eryurek et al. | |
| 2002/0055790 A1 | 5/2002 | Havekost | |
| 2002/0077711 A1 | 6/2002 | Nixon et al. | |
| 2002/0123856 A1 | 9/2002 | Eryurek | |
| 2002/0123864 A1 | 9/2002 | Eryurek et al. | |
| 2002/0147506 A1 | 10/2002 | Eryurek et al. | |
| 2002/0147511 A1 | 10/2002 | Eryurek et al. | |
| 2002/0161940 A1 | 10/2002 | Eryurek et al. | |
| 2002/0163427 A1 | 11/2002 | Eryurek et al. | |
| 2002/0169514 A1 | 11/2002 | Eryurek et al. | |
| 2003/0028268 A1 | 2/2003 | Eryurek et al. | |
| 2003/0195934 A1 | 10/2003 | Peterson et al. | |
| 2004/0204775 A1 | 10/2004 | Keyes et al. | |
| 2005/0007249 A1 | 1/2005 | Eryurek et al. | |
| 2005/0012608 A1 | 1/2005 | Havekost et al. | |
| 2005/0033466 A1 | 2/2005 | Eryurek et al. | |
| 2005/0079447 A1 | 4/2005 | Uegaki et al. | |
| 2005/0119568 A1 | 6/2005 | Salcudean et al. | |
| 2005/0193810 A1 | 9/2005 | Gladden | |
| 2005/0197803 A1 | 9/2005 | Eryurek et al. | |
| 2005/0197805 A1 | 9/2005 | Eryurek et al. | |
| 2005/0197806 A1 | 9/2005 | Eryurek et al. | |
| 2006/0228214 A1 | 10/2006 | Mabe et al. | |
| 2007/0043497 A1 | 2/2007 | Leogrande et al. | |
| 2008/0168356 A1 | 7/2008 | Eryurek et al. | |
| 2010/0286798 A1 | 11/2010 | Keyes et al. | |
| 2010/0293019 A1 | 11/2010 | Keyes et al. | |
| 2011/0046897 A1 | 2/2011 | Blumenthal et al. | |
| 2012/0054273 A1 | 3/2012 | Peterson et al. | |
| 2015/0278391 A1 | 10/2015 | Peterson et al. | |

FOREIGN PATENT DOCUMENTS

| | | |
|---|---|---|
| JP | 2-10000 A | 1/1990 |
| JP | 2001-329856 A | 11/2001 |
| JP | 2002-162298 A | 6/2002 |
| JP | 2002-333916 A | 11/2002 |
| JP | 2003-97410 A | 4/2003 |
| JP | 2004-537773 A | 12/2004 |
| JP | 2006-46955 A | 2/2006 |
| JP | 2007-51634 A | 3/2007 |
| JP | 2010-519450 A | 6/2010 |
| JP | 2010-181151 A | 8/2010 |
| JP | 2011-157894 A | 8/2011 |
| JP | 2012-245495 A | 12/2012 |
| JP | 2013-79920 A | 5/2013 |
| JP | 2014-202144 A | 10/2014 |
| RU | 2 280 846 C1 | 7/2006 |

* cited by examiner

STRAIN ESTIMATION DEVICE, DIAGNOSIS DEVICE, AND STRAIN ESTIMATION METHOD

TECHNICAL FIELD

The present disclosure relates to a strain estimation device, a diagnosis device, and a strain estimation method.

BACKGROUND ART

There is known a conventional diagnostic system for predicting the lifetimes of components and the like. For example, Patent Literature 1 discloses a system for diagnosing a fatigue-damage degree of a vehicle to warn that the lifetime of a front side member is coming to the end by calculating the fatigue-damage degree of the front side member based on the strain detected by a strain sensor (strain gauge).

CITATION LIST

Patent Literature

Patent Literature 1: Japanese Unexamined Patent Publication No. 2013-79920

SUMMARY OF INVENTION

Technical Problem

For example, in order to evaluate, in real time, the remaining lifetime of a component that receives stress in a fluid, it is required to acquire the strain of the component in real time. However, it is difficult to directly attach a strain gauge to, for example, an inducer blade in a turbo pump for a spacecraft during flight of the spacecraft. Similarly to this, it can be difficult to attach a strain gauge to a component to be evaluated during the use of the component. Alternatively, although a strain gauge is able to be attached to a component to be evaluated, some processing can be required. For this reason, a method without using a strain gauge has been desired.

The present disclosure describes a strain estimation device, a diagnosis device, and a strain estimation method capable of acquiring strain without using a strain gauge.

Solution to Problem

A strain estimation device according to an aspect of the present disclosure is a device that estimates strain of a component provided in a fluid. The strain estimation device includes a pressure acquisition unit that acquires a pressure signal including time-series pressure values at a predetermined position in a vicinity of the component, an estimation unit that estimates, based on the pressure signal, a strain signal including time-series strain values occurring at the component, and an output unit that outputs the strain signal. The estimation unit converts the pressure signal into the strain signal using an estimation filter determined based on a power spectral density of pressure and a power spectral density of strain occurring at the component when the pressure is applied to the position.

Effects of Invention

According to the present disclosure, it is possible to acquire strain without using a strain gauge.

DESCRIPTION OF EMBODIMENTS

[1] Outline of Embodiment

A strain estimation device according to an aspect of the present disclosure is a device that estimates strain of a component provided in a fluid. The strain estimation device includes a pressure acquisition unit that acquires a pressure signal including time-series pressure values at a predetermined position in a vicinity of the component, an estimation unit that estimates, based on the pressure signal, a strain signal including time-series strain values occurring at the component, and an output unit that outputs the strain signal. The estimation unit converts the pressure signal into the strain signal using an estimation filter determined based on a power spectral density of pressure and a power spectral density of strain occurring at the component when the pressure is applied to the position.

A strain estimation method according to another aspect of the present disclosure is a method performed by a strain estimation device that estimates strain of a component provided in a fluid. The strain estimation method includes a pressure acquisition step of acquiring a pressure signal including time-series pressure values at a predetermined position in a vicinity of the component, an estimation step of estimating, based on the pressure signal, a strain signal including time-series strain values occurring at the component, and an output step of outputting the strain signal. In the estimation step, the pressure signal is converted into the strain signal using an estimation filter determined based on a power spectral density of pressure and a power spectral density of strain occurring at the component when the pressure is applied to the position.

In the strain estimation device and the strain estimation method, a pressure signal including time-series pressure values at a predetermined position in a vicinity of a component is converted into a strain signal including time-series strain values occurring at the component using an estimation filter, and the converted strain signal is output. A correlation between the power spectral density of pressure at the predetermined position in the vicinity of the component and the power spectral density of strain occurring at the component has been found. Thus, it is possible to convert the pressure signal into the strain signal using the estimation filter determined based on the relationship between the power spectral density of pressure and the power spectral density of strain. Since a strain signal is estimated using a pressure signal in this manner, it is possible to acquire the strain occurring at a component without using a strain gauge.

The strain estimation device may further include an offset removal unit that removes offset from the pressure signal, and an offset recovery unit that recovers offset of the strain signal. The estimation unit may convert the pressure signal from which the offset has been removed into the strain signal. The output unit may output the strain signal in which the offset has been recovered. In this case, by removing the offset from the pressure signal, it is possible to extract a fluctuation component of the pressure signal. By using the fluctuation component of the pressure signal, it is possible to improve the accuracy of the conversion from the pressure signal into the strain signal. Then, by recovering the offset of the strain signal, it is possible to improve the accuracy of the estimation of the strain occurring at the component.

A diagnosis device according to yet another aspect of the present disclosure is a device that diagnoses an accumulated fatigue-damage degree of a component. This diagnosis device includes the strain estimation device, a stress calculation unit that calculates, based on the strain signal output from the strain estimation device, a stress signal including time-series stress values applied to the component, and an accumulated-fatigue-damage-degree calculation unit that calculates the accumulated fatigue-damage degree of the component based on the stress signal. In this diagnosis device, a stress signal including time-series stress values applied to a component is calculated based on the strain signal output from the strain estimation device, and the accumulated fatigue-damage degree of the component is calculated based on the stress signal. In the strain estimation device, the strain occurring at the component is acquired, and it is possible to acquire the accumulated fatigue-damage degree of the component without using a strain gauge.

[2] Exemplification of Embodiment

Hereinafter, an embodiment of the present disclosure is described in detail with reference to the accompanying drawings. In the description of the drawings, identical or equivalent elements are denoted by the same reference signs, and overlapped descriptions are omitted.

Figure 1:
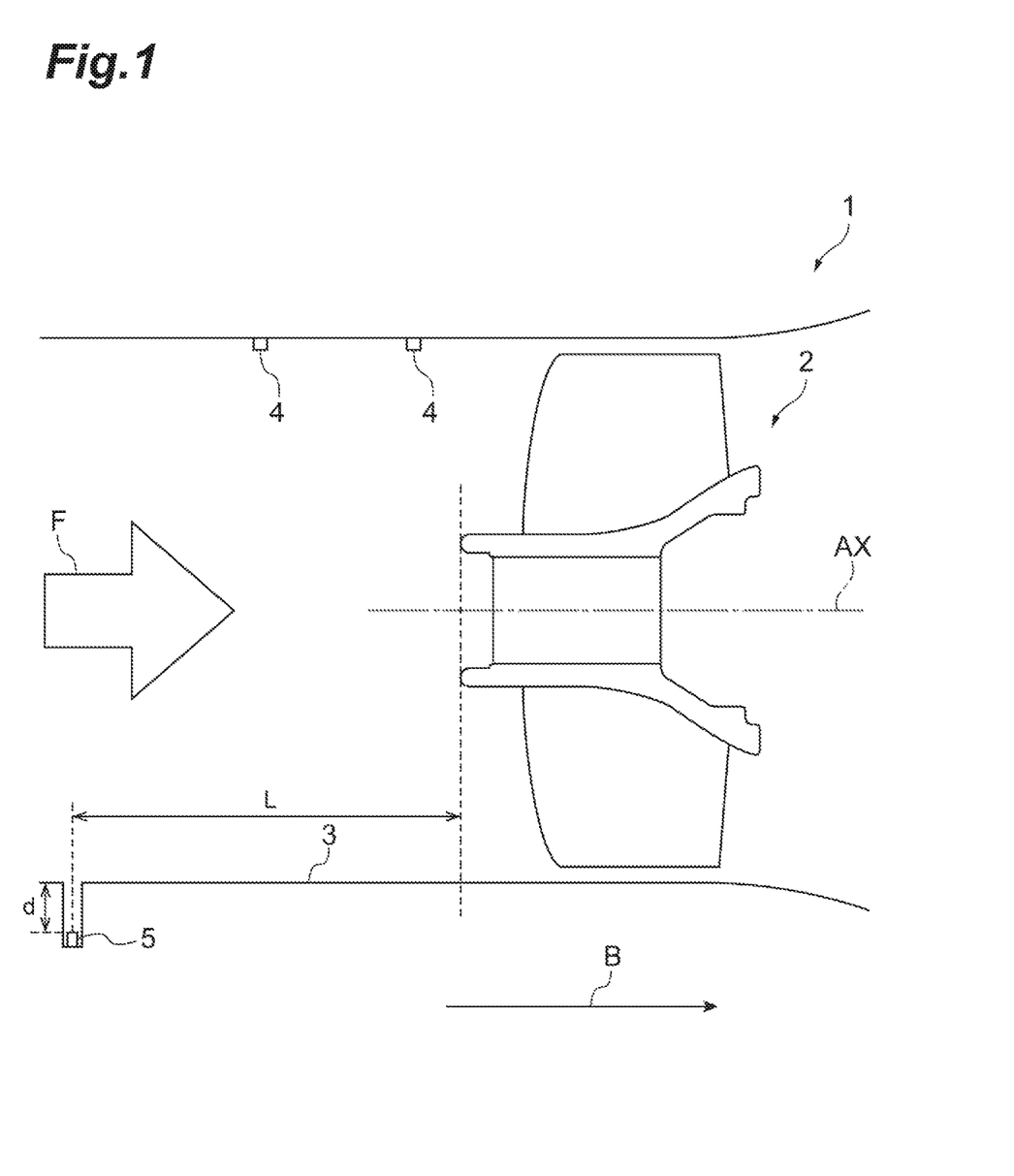
FIG. 1 is a diagram schematically showing an example of a diagnosis target of a diagnosis device including a strain estimation device according to the present embodiment.

FIG. 1 is a diagram schematically showing an example of a diagnosis target of a diagnosis device including a strain estimation device according to the present embodiment. As shown in FIG. 1, an inducer 2 (component) provided in a turbo pump of a rocket 1 is a diagnosis target. The rocket 1 is a device that obtains propulsive power from reaction by injection, and is a reusable rocket that can be used repeatedly. The rocket 1 is, for example, a liquid rocket. In the rocket engine of the rocket 1, liquid fuel F (fluid) such as liquid hydrogen and liquid oxygen is used as fuel. The rocket 1 is provided with a turbo pump for supplying the high-pressure liquid fuel F. The inducer 2 is a rotating body provided on the input side of the turbo pump in order to improve the suction performance of the turbo pump. The inducer 2 is provided in a pipe 3 extending in a direction B and rotates about a rotation axis AX extending in the extending direction of the pipe 3. The inducer 2 sucks the liquid fuel F flowing through the pipe 3 and pressurizes the liquid fuel F.

Since the inducer 2 sucks the low-pressure liquid fuel F, when the pressure of the liquid fuel F becomes lower than the saturated vapor pressure of the liquid fuel F, the liquid fuel F boils and many small bubbles are generated. Then, when the pressure around the bubbles becomes higher than the saturated vapor pressure of the liquid fuel F, the bubbles disappear. At this moment, since the liquid fuel F around the bubble collides in the vicinity of the center of the bubbles, a pressure wave is generated, and which generates vibration. It is known that cavitation occurs in the liquid fuel F, and stress is applied to the inducer 2 by the cavitation in this manner. Stress due to various factors besides cavitation is applied to the inducer 2. As the stress is accumulated in the inducer 2, this can damage the inducer 2. Especially an inducer blade in the inducer 2 may be a diagnosis target, but in the following description, it is described that the inducer 2 is the diagnosis target.

A pressure sensor 4 is provided on the inner surface of the pipe 3. The pressure sensor 4 is provided in the vicinity of the inducer 2. A position at which the pressure sensor 4 is provided is set within the range in which the energy of vibration generated at the position reaches the inducer 2. In the example shown in FIG. 1, the pressure sensors 4 are disposed, in the direction B along the rotation axis AX of the inducer 2, at the substantially same position as the input side front end of the inducer 2 and at an upstream position of the liquid fuel F separated by a predetermined distance from the input side front end of the inducer 2. The pressure sensor 4 may be disposed at a downstream position of the liquid fuel F separated by a predetermined distance from the output side front end of the inducer 2. The pressure sensor 4 measures the pressure in the vicinity of the inducer 2, and transmits the measured pressure to the diagnosis device 10.

The pipe 3 is provided with a sensor 5 that measures environmental information at an interface unit. The sensor 5 is, for example, a temperature sensor and a pressure sensor. The sensor 5 is disposed at an upstream position of the liquid fuel F separated by a distance L from the input side front end of the inducer 2 and having a depth d from the inner surface of the pipe 3. The sensor 5 measures the pressure and the temperature of the interface unit, and transmits the measured pressure and temperature to the diagnosis device 10. In the vicinity of the inducer 2, a flow meter (not shown) that measures the flow rate of the liquid fuel F and a rotation sensor (not shown) that measures the rotational speed of the inducer 2 are disposed. The flow meter measures the flow rate of the liquid fuel F, and transmits the measured flow rate to the diagnosis device 10. The rotation sensor measures the rotational speed of the inducer 2, and transmits the measured rotational speed to the diagnosis device 10.

Figure 2:
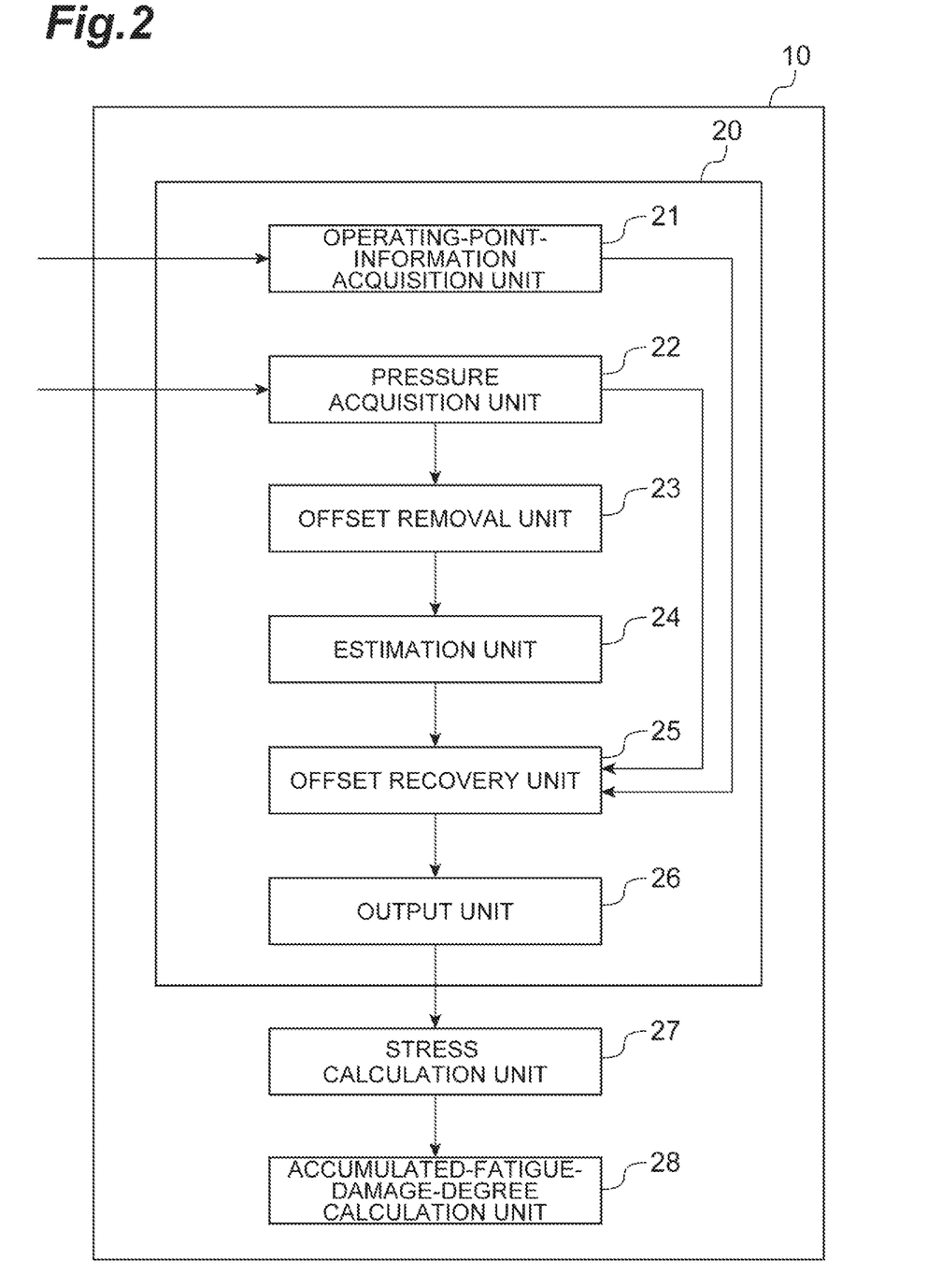
FIG. 2 is a functional block diagram of the diagnosis device including the strain estimation device according to the present embodiment.

FIG. 2 is a functional block diagram of the diagnosis device including the strain estimation device according to the present embodiment. The diagnosis device 10 shown in FIG. 2 is a device that diagnoses the accumulated fatigue-damage degree of the inducer 2.

Figure 3:
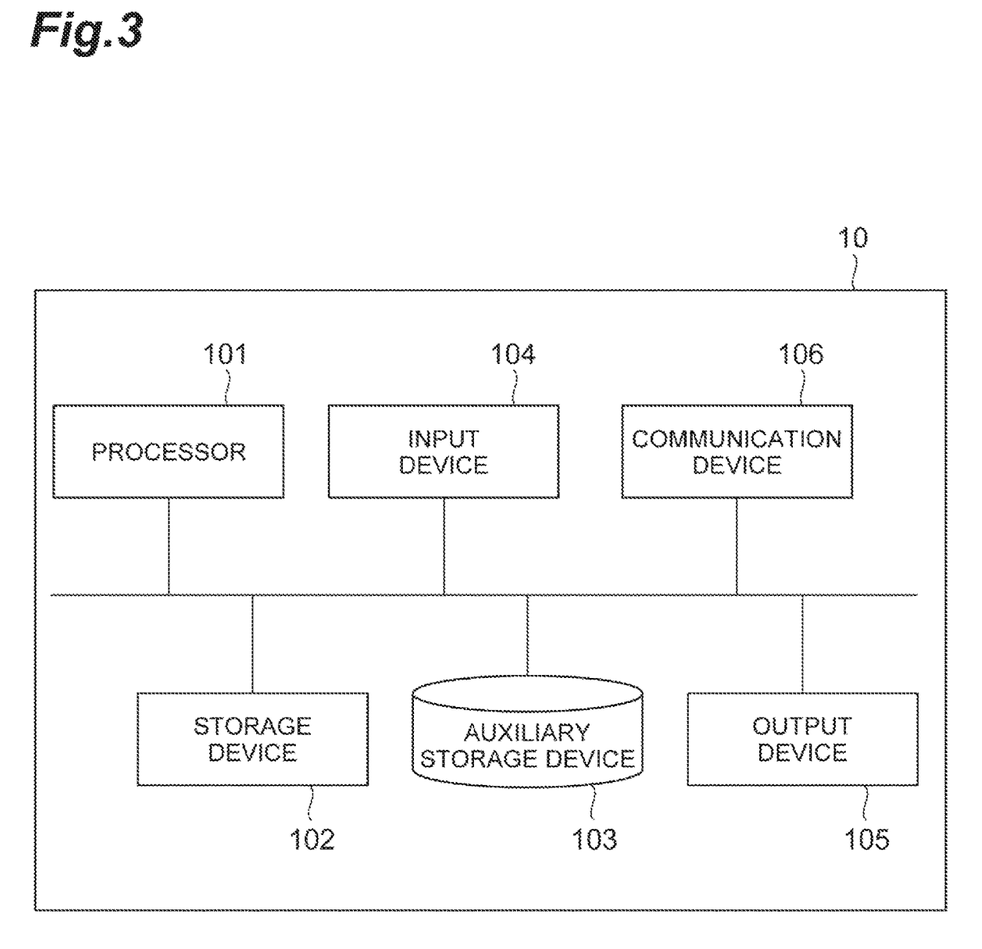
FIG. 3 is a hardware configuration diagram of the diagnosis device in FIG. 2.

FIG. 3 is a hardware configuration diagram of the diagnosis device in FIG. 2. As shown in FIG. 3, the diagnosis device 10 can be constituted physically as a computer including one or more processors 101, a storage device 102 which is a main storage device such as a random-access memory (RAM) or a read only memory (ROM), an auxiliary storage device 103 such as a hard disk device, an input device 104 such as a keyboard, an output device 105 such as a display, and a communication device 106 which is a data transmission/reception device. Each function of the diagnosis device 10 shown in FIG. 2 is implemented by loading one or more predetermined computer programs in hardware such as one or more processors 101 and the storage device 102 to operate the hardware under the control of one or more processors 101, and by reading and writing data in the storage device 102 and the auxiliary storage device 103. It has been described that the diagnosis device 10 has the above hardware configuration, but a strain estimation device 20, which will be described later, may be constituted as a computer including a processor 101, a storage device 102, an auxiliary storage device 103, an input device 104, an output device 105, and a communication device 106.

Returning to FIG. 2, the details of the diagnosis device 10 is described. The diagnosis device 10 includes a strain estimation device 20, a stress calculation unit 27, and an accumulated-fatigue-damage-degree calculation unit 28.

The strain estimation device 20 is a device that estimates strain of the inducer 2. The strain estimation device 20 includes an operating-point-information acquisition unit 21, a pressure acquisition unit 22, an offset removal unit 23, an estimation unit 24, an offset recovery unit 25, and an output unit 26.

The operating-point-information acquisition unit 21 functions as operating-point-information acquisition means for acquiring operating-point information about the inducer 2. The operating-point-information acquisition unit 21 acquires, as the operating-point information, the pressure and temperature measured by the sensor 5, the flow rate measured by the flow meter, and the rotational speed measured by the rotation sensor. The operating-point-information acquisition unit 21 outputs the operating-point information to the offset recovery unit 25.

The pressure acquisition unit 22 functions as pressure acquisition means for acquiring a pressure signal (pressure response) $\{p_n\}$ including time-series pressure values $p_n$ at a predetermined position in the vicinity of the inducer 2. The pressure acquisition unit 22 samples the pressure measured by the pressure sensor 4 at a sampling cycle $T_s$ of, for example, about 0.1 millisecond (ms) to acquire the pressure as the pressure signal $\{p_n\}$ including the time-series pressure values $p_n$. The pressure acquisition unit 22 outputs the pressure signal $\{p_n\}$ to the offset removal unit 23 and the offset recovery unit 25.

The offset removal unit 23 functions as offset removal means for removing offset from the pressure signal $\{p_n\}$. The offset is a fixed component (DC component), which is constantly applied, among the pressure measured by the pressure sensor 4. By removing the offset from each pressure value p of the pressure signal $\{p_n\}$, a fluctuation component (that is, a pressure value $p_n'$) of the pressure value $p_n$ is extracted. The offset removal unit 23 sets, for example, the average value of the pressure values $p_n$ in a predetermined period among the time series pressure values p as the offset. The offset removal unit 23 subtracts the offset from each pressure value $p_n$ of the pressure signal $\{p_n\}$, and sets the subtraction result as each pressure value $p_n'$. As a result, the offset removal unit 23 obtains the pressure signal $\{p_n'\}$ from which the offset has been removed. In this manner, the offset removal unit 23 removes the offset from the pressure signal $\{p_n\}$. The offset removal unit 23 outputs the pressure signal $\{p_n'\}$ from which the offset has been removed to the estimation unit 24.

The estimation unit 24 functions as estimation means for estimating, based on the pressure signal $\{p_n'\}$, a strain signal (strain response) $\{\varepsilon_n'\}$ including time-series strain values $\varepsilon_n'$ occurring at the inducer 2. The estimation unit 24 converts the pressure signal $\{p_n'\}$ from which the offset has been removed into the strain signal $\{\varepsilon_n'\}$ using an estimation filter. The estimation filter is a filter for evaluating high cycle fatigue life, and is determined based on the power spectral density of pressure and the power spectral density of strain occurring at the inducer 2 when the pressure is applied to the position at which the pressure sensor 4 is provided. The power spectral density indicates the energy distribution of the signal in the frequency direction. A method for deriving the estimation filter will be described later. The estimation unit 24 outputs the strain signal $\{\varepsilon_n'\}$ to the offset recovery unit 25.

The offset recovery unit 25 functions as offset recovery means for recovering offset of the strain signal $\{\varepsilon_n'\}$. The offset recovery unit 25 calculates the offset of strain based on the operating-point information acquired by the operating-point-information acquisition unit 21. The offset recovery unit 25 calculates the offset of strain using, for example, regression equations for the rotational speed of the inducer 2, the pressure of the interface unit, the temperature of the interface unit, and the flow rate of the liquid fuel F. The offset recovery unit 25 may calculate the offset of strain further based on the pressure signal $\{p_n\}$. The offset recovery unit 25 adds the offset to each strain value $\varepsilon_n'$ of the strain signal $\{\varepsilon_n'\}$, and sets the addition result as each strain value $\varepsilon_n$. As a result, the offset recovery unit 25 obtains a strain signal $\{\varepsilon_n\}$ in which the offset has been recovered. In this manner, the offset recovery unit 25 recovers the offset of the strain signal $\{\varepsilon_n'\}$. The offset recovery unit 25 outputs the strain signal $\{\varepsilon_n\}$ in which the offset has been recovered to the output unit 26.

The output unit 26 functions as output means for outputting the strain signal $\{\varepsilon_n\}$. When receiving the strain signal $\{\varepsilon_n\}$ from the offset recovery unit 25, the output unit 26 outputs the strain signal $\{\varepsilon_n\}$ to the stress calculation unit 27.

The stress calculation unit 27 functions as stress calculation means for calculating, based on the strain signal $\{\varepsilon_n\}$ output from the strain estimation device 20, a stress signal (stress response) $\{s_n\}$ including time-series stress values $s_n$ applied to the inducer 2. The stress calculation unit 27 calculates each stress value s based on the modulus of longitudinal elasticity E, the Poisson's ratio v, and each strain value $\varepsilon_n$, as shown in Formula (1). The modulus of longitudinal elasticity E is, for example, 203.011/Pa. The Poisson's ratio v is, for example, 0.290.

[Formula 1]

$$s_n = \frac{E}{1-v^2}\varepsilon_n \tag{1}$$

The accumulated-fatigue-damage-degree calculation unit 28 functions as accumulated-fatigue-damage-degree calculation means for calculating the accumulated fatigue-damage degree of the inducer 2 based on the stress signal $\{s_n\}$. The accumulated-fatigue-damage-degree calculation unit 28 decomposes the stress signal $\{s_n\}$ into an array of combinations of the stress amplitude and the average stress of $\{j, s_a^{(j)}, s_m^{(j)} | j \in \{1, \ldots N_p\}\}$ using, for example, a rainflow-counting algorithm. The combination number j is a number for identifying each combination, and is an integer value of 1 or more and $N_p$ or less. $N_p$ is the number of extreme values appearing in a target time section, that is, the number of vibrations. The target time section is a time section during which a stress signal $\{s_n\}$ to be evaluated is extracted, and is, for example, about several seconds. The stress amplitude $s_a^{(j)}$ is the amplitude of the waveform of the stress signal $\{s_n\}$ in the target time section, and is the difference between the maximum stress value and the minimum stress value of the stress signal $\{s_n\}$ in the target time section. The average stress $s_m^{(j)}$ is the center of the waveform of the stress signal $\{s_n\}$ in the target time section, and is the intermediate value between the maximum stress value and the minimum stress value of the stress signal $\{s_n\}$ in the target time section.

The accumulated-fatigue-damage-degree calculation unit 28 converts the stress amplitude $s_a^{(j)}$ of each combination into the converted stress $s_s^{(j)}$ in order to be applied to the modified Minor's rule with Formula (2). The converted stress $s_s^{(j)}$ is a stress obtained by converting the stress amplitude $s_a^{(j)}$ into an S—N curve. A tensile strength $s_b$ is the tensile strength of the blade material of the inducer 2, which is a fixed value predetermined by the material of the blade. The tensile strength $s_b$ is, for example, 1657.0 MPa. The fatigue notch factor $\beta$ is, for example, 1.1.

[Formula 2]

$$s_s^{(j)} = \beta \frac{s_a^{(j)}}{1 - \frac{s_m^{(j)}}{s_b}} \quad (2)$$

Based on the S—N curve of the blade material of the inducer 2, the accumulated-fatigue-damage-degree calculation unit 28 calculates, with Formula (3), the number of loading cycles to failure $N_d^{(j)}$ at which the inducer 2 is damaged when only the converted stress $s_s^{(j)}$ is applied to the inducer 2. The constant $M_0$ and the constant $M_1$ are constants of the S—N curve.

[Formula 3]

$$N_d^{(j)} = M_0 (s_s^{(j)})^{M_1} \quad (3)$$

When the modified Minor's rule is used, an accumulated fatigue-damage degree D is expressed by Formula (4). The accumulated-fatigue-damage-degree calculation unit 28 calculates an accumulated fatigue-damage degree D of the inducer 2 with Formula (4).

[Formula 4]

$$D = \sum_{j=1}^{N_p} \frac{1}{N_d^{(j)}} \quad (4)$$

The accumulated-fatigue-damage-degree calculation unit 28 may calculate the accumulated fatigue-damage degree D per unit time by dividing the accumulated fatigue-damage degree D by the target time section. The accumulated-fatigue-damage-degree calculation unit 28 outputs the calculated accumulated fatigue-damage degree D.

Here, a method for deriving the estimation filter is described. An experiment in which a strain gauge is attached to the inducer 2 and pressure is applied to the vicinity of the inducer 2 at desired operating points (the flow rate of the liquid fuel F, the rotational speed of the inducer 2, and the pressure and temperature of the interface unit) is performed. In this experiment, by sampling the pressure measured by the pressure sensor 4 at a sampling cycle $T_s$ of, for example, about 0.1 ms, a pressure signal $\{p_n\}$ including time-series pressure values $p_n$ is acquired. In addition, by sampling the strain measured by the strain gauge at the same sampling cycle $T_s$ as the pressure, a strain signal $\{\varepsilon_n\}$ including time-series strain values $\varepsilon_n$ is acquired.

By dividing the pressure signal $\{p_n\}$ and the strain signal $\{\varepsilon_n\}$ at every predetermined time $T_{fft}$ and removing the offset from each pressure value $p_n$ and each strain value $\varepsilon_n$ of respective divided combinations, combinations of the pressure value and strain value, from each of which the offset has been removed, of $\{p_n', \varepsilon_n' | t_{ini} + T_{fft} \times (x-1) < t_n < T_{ini} + T_{fft} \times x\}$ are obtained. Note that, $x \in \{1, 2, \ldots, m\}$ holds. As the offset of the pressure value, for example, the moving average of the pressure values $p_n$ is used. Similarly, as the offset of the strain value, for example, the moving average of the strain value $\varepsilon_n$ is used. The number of ensembles m is, for example, 40 or more.

For each of the m combinations, the power spectral density $S_1^{(x)}(f)$ at the frequency f of the pressure $\{p_n'\}$ and the power spectral density $S_2^{(x)}(f)$ at the frequency f of the strain value $\{\varepsilon_n'\}$ are calculated based on the known Welch's method. Then, by calculating the square root of the ratio of the power spectral density $S_2^{(x)}(f)$ to the power spectral density $S_1^{(x)}(f)$ as shown in Formula (5), m gains $\{\tilde{A}_x(f) | x=1, 2, \ldots, m\}$ are obtained. The gains $\tilde{A}_x(f)$ are gains for the time section $[t_{ini} + T_{fft} \times (x-1), t_{ini} + T_{fft} \times x]$.

[Formula 5]

$$\tilde{A}_x(f) = \sqrt{\frac{S_2^{(x)}(f)}{S_1^{(x)}(f)}} \quad (5)$$

Then, as shown in Formulae (6) and (7), the ensemble average $\mu_m(f)$ and the standard deviation $\sigma_m(f)$ of the m gains $\tilde{A}_x(f)$ are calculated.

[Formula 6]

$$\mu_m(f) = \frac{1}{m} \sum_{x=1}^{m} \tilde{A}_x(f) \quad (6)$$

[Formula 7]

$$\sigma_m(f) = \sqrt{\frac{1}{m-1} \sum_{x=1}^{m} [\tilde{A}_x(f) - \mu_m(f)]^2} \quad (7)$$

Then, as shown in Formula (8), the design gain $A_{m,k}(f)$ is calculated using the ensemble average $\mu_m(f)$ and the standard deviation $\sigma_m(f)$.

[Formula 8]

$$A_{m,k}(f) = \mu_m(f) + k\sigma_m(f) \quad (8)$$

Next, the design gain $A_{m,k}(f)$ is fitted by a rational function. To fit the gain, the transfer function $G_s(s)$ shown in Formula (9) is used. The parameters $C_i$ and $D_i$ are obtained by performing the partial fraction decomposition with respect to the second expression of Formula (9), and are determined by the natural angular frequency $\omega_{p,i}$, the natural angular frequency $\omega_{z,k}$, the damping coefficient $\zeta_{p,i}$, and the damping coefficient $\zeta_{z,k}$.

[Formula 9]

$$G_s(s) = K \frac{\prod_{k}^{m_z}(s^2 + 2\zeta_{z,k}\omega_{z,k}s + \omega_{z,k}^2)/\omega_{z,k}^2}{\prod_{i}^{m_p}(s^2 + 2\zeta_{p,i}\omega_{p,i}s + \omega_{p,i}^2)/\omega_{p,i}^2} = \tag{9}$$

$$\left(K \frac{\prod_{i}^{m_p}\omega_{p,i}^2}{\prod_{k}^{m_z}\omega_{z,k}^2}\right) \times \left(k + \sum_{i}^{m_p} \frac{C_i s + D_i}{s^2 + 2\zeta_{p,i}\omega_{p,i}s + \omega_{p,i}^2}\right)$$

$\omega_{p,i}$: NATURAL ANGULAR FREQUENCY OF POLE
$\omega_{z,k}$: NATURAL ANGULAR FREQUENCY OF ZERO-POINT
$\zeta_{p,i}$: DAMPING COEFFICIENT OF POLE
$\zeta_{z,k}$: DAMPING COEFFICIENT OF ZERO-POINT
$K$: FIXED GAIN
$m_p$: NUMBER OF POLES
$m_z$: NUMBER OF ZERO-POINTS When the number $m_p$ is the number $m_z$ or more, the transfer function $G_s(s)$ is Z-converted to obtain the discrete transfer function $G_z(z)$ shown in Formula (10). The coefficient $a_i$ and the coefficient $b_k$ are determined by a combination of parameters of the fixed gain K, the number $m_p$, the number $m_z$, the damping coefficient $\zeta_{p,i}$, the natural angular frequency $\omega_{p,i}$, the damping coefficient $\zeta_{z,k}$, and the natural angular frequency $\omega_{z,k}$.

[Formula 10]

$$G_z(z) = \tag{10}$$

$$\left(K \frac{\prod_{i}^{m_p}\omega_{p,i}^2}{\prod_{k}^{m_z}\omega_{z,k}^2}\right) \times \left(k + \sum_{i}^{m_p} \frac{b_{0,i} + b_{1,i}z^{-1} + b_{2,i}z^{-2}}{a_{0,i} + a_{1,i}z^{-1} + a_{2,i}z^{-2}}\right) = \frac{\sum_{k}^{2m_p} b_k z^{-2m_p+k}}{\sum_{i}^{2m_p} a_i z^{-2m_p+i}}$$

$a_i \mid i \in \{0, 1, \ldots, 2m_p\}$
$b_k \mid k \in \{0, 1, \ldots, 2m_p\}$

The gain $A_z(f)$ of this discrete transfer function $G_z(z)$ is expressed by the form shown in Formula (11). The design gain $A_{m,k}(f)$ is fitted using the gain $A_z(f)$. Note that the term "to fit" means to set a combination of parameters $\{K, m_p, m_z, \zeta_{p,i}, \omega_{p,i}, \zeta_{z,k}, \omega_{z,k}\}$ so that the difference between the design gain $A_{m,k}(f)$ and the gain $A_z(f)$ is to be minimized.

[Formula 11]

$$A_z(f) = G_z(e^{j\omega T_z}) = \frac{\sum_{k}^{2m_p} b_k e^{j\omega T_z - 2m_p + k}}{\sum_{i}^{2m_p} a_i e^{j\omega T_z - 2m_p + i}} \tag{11}$$

As a result of the above fitting, the coefficient $a_i$ and the coefficient $b_k$ ($i \in \{1, 2, \ldots, 2m_p-1, 2m_p\}$, $k \in \{0, 1, \ldots, 2m_p-1, 2m_p\}$) are obtained. Here, as shown in Formula (12), the discrete transfer function $Gr_z(z)$ is expressed using the pressure value $p_n'$ and the strain value $\varepsilon_n'$ at time n.

[Formula 12]

$$G_z(z) = \frac{\sum_{k}^{2m_p} b_k z^{-2m_p+k}}{\sum_{i}^{2m_p} a_i z^{-2m_p+i}} = \frac{\sum_{k}^{\infty} \varepsilon_{n-k}' z^k}{\sum_{i}^{\infty} p_{n-i}' z^i} \tag{12}$$

As a result, as shown in equation (13), the estimation filter defining the relationship between the strain value $\varepsilon_n'$ and the pressure value $p_n'$ is derived.

[Formula 13]

$$\varepsilon_n' = -\sum_{i=1}^{2m_p} a_i \varepsilon_{n-1}' + \sum_{k=0}^{2m_p} b_k p_{n-k}' \tag{13}$$

Figure 4:
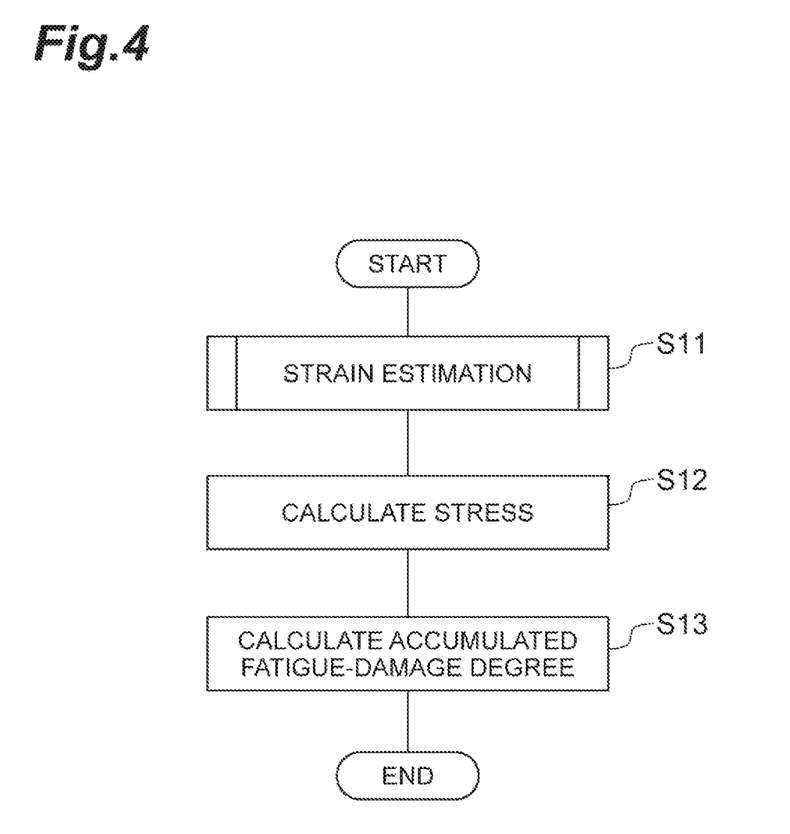
FIG. 4 is a flowchart showing an example of a diagnosis method performed by the diagnosis device in FIG. 2.
Figure 5:
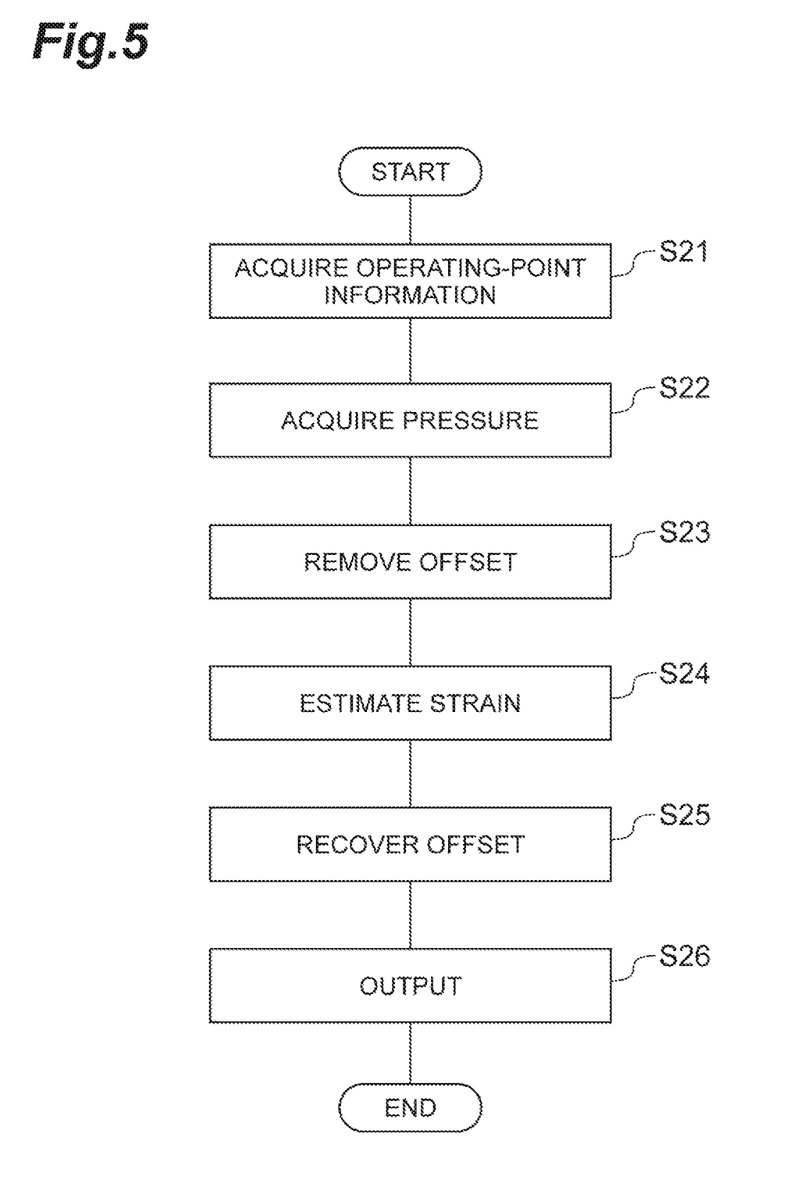
FIG. 5 is a flowchart showing the details of an example of strain estimation processing in FIG. 4.

Next, with reference to FIGS. 4 and 5, an example of a diagnosis method performed by the diagnosis device 10 is described. FIG. 4 is a flowchart showing an example of a diagnosis method performed by the diagnosis device in FIG. 2. FIG. 5 is a flowchart showing the details of an example of strain estimation processing in FIG. 4. A series of processing shown in FIG. 4 is started at the timing when the operation of the rocket 1 is started.

First, the strain estimation device 20 performs strain estimation processing (a strain estimation method) (step S11). In the strain estimation processing in step S11, first, the operating-point-information acquisition unit 21 acquires operating-point information about the inducer 2 as shown in FIG. 5 (step S21: operating-point information acquisition step). Specifically, the operating-point-information acquisition unit 21 acquires, as the operating-point information, the pressure and temperature of the interface unit measured by the sensor 5, the flow rate of the liquid fuel F measured by the flow meter, and the rotational speed of the inducer 2 measured by the rotation sensor. Then, the operating-point-information acquisition unit 21 outputs the operating-point information to the offset recovery unit 25.

Next, the pressure acquisition unit 22 acquires a pressure signal $\{p_n\}$ including time-series pressure values $p_n$ at a predetermined position in the vicinity of the inducer 2 (step S22: pressure acquisition step). Specifically, the pressure acquisition unit 22 sets the pressure values obtained by sampling the pressure measured by the pressure sensor 4 at the sampling cycle $T_s$ as the time series pressure values $p_n$ to acquire the pressure signal $\{p_n\}$. Then, the pressure acquisition unit 22 outputs the pressure signal $\{p_n\}$ to the offset removal unit 23.

Next, the offset removal unit 23 removes offset from the pressure signal $\{p_n\}$ (step S23: offset removal step). For example, the offset removal unit 23 sets the average value of the pressure values $p_n$ in a predetermined period among the time series pressure values $p_n$ as the offset and subtracts the offset from each pressure value $p_n$ of the pressure signal $\{p_n\}$ to remove the offset from the pressure signal $\{p_n\}$ Then, the offset removal unit 23 outputs the pressure signal $\{p_n'\}$ from which the offset has been removed to the estimation unit 24.

Next, the estimation unit 24 estimates a strain signal $\{\varepsilon_n'\}$ including time-series strain values $\varepsilon_n'$ occurring at the inducer 2 based on the pressure signal $\{p_n'\}$ (step S24: estimation step). Specifically, the estimation unit 24 converts the pressure signal $\{p_n'\}$ from which the offset has been removed into the strain signal $\{\varepsilon_n'\}$ using the estimation filter expressed by Formula (13). Then, the estimation unit 24 outputs the strain signal $\{\varepsilon_n'\}$ to the offset recovery unit 25.

Next, the offset recovery unit 25 recovers offset of the strain signal $\{\varepsilon_n'\}$ (step S25: offset recovery step). For example, the offset recovery unit 25 calculates the offset of strain based on the operating-point information acquired by the operating-point-information acquisition unit 21 and adds the offset to each strain value $\varepsilon_n'$ of the strain signal $\{\varepsilon_n'\}$ to recover the offset of the strain signal $\{\varepsilon_n'\}$. Then, the offset recovery unit 25 outputs the strain signal $\{\varepsilon_n\}$ in which the offset has been recovered to the output unit 26. Then, the output unit 26 outputs the strain signal $\{\varepsilon_n\}$ in which the offset has been recovered to the stress calculation unit 27 (step S26: output step).

Next, the stress calculation unit 27 calculates, based on the strain signal $\{\varepsilon_n\}$ output from the strain estimation device 20, a stress signal $\{s_n\}$ including time-series stress values $s_n$ applied to the inducer 2 (step S12: stress calculation step). Specifically, the stress calculation unit 27 calculates each stress value $s_n$ based on each strain value c with Formula (1) to acquire the stress signal $\{s_n\}$. Then, the stress calculation unit 27 outputs the stress signal $\{s_n\}$ to the accumulated-fatigue-damage-degree calculation unit 28.

Next, the accumulated-fatigue-damage-degree calculation unit 28 calculates an accumulated fatigue-damage degree D of the inducer 2 based on the stress signal $\{s_n\}$ (step S13: accumulated-fatigue-damage-degree calculation step). First, the accumulated-fatigue-damage-degree calculation unit 28 decomposes the stress signal $\{s_n\}$ into an array of combinations of the stress amplitude and the average stress of $\{j, s_a^{(j)}, s_m^{(j)} | j \in \{1, \ldots N_p\}\}$ using a rainflow-counting algorithm or the like. Then, the accumulated-fatigue-damage-degree calculation unit 28 converts the stress amplitude $s_a^{(j)}$ of each combination into the converted stress $s_s^{(j)}$ with Formula (2). Then, the accumulated-fatigue-damage-degree calculation unit 28 calculates, with Formula (3), the number of loading cycles to failure $N_d^{(j)}$ at which the inducer 2 is damaged when only the converted stress $s_s^{(j)}$ is applied to the inducer 2. Then, the accumulated-fatigue-damage-degree calculation unit 28 calculates the accumulated fatigue-damage degree D with Formula (4). Then, the accumulated-fatigue-damage-degree calculation unit 28 outputs the accumulated fatigue-damage degree D. In this manner, a series of processing of the diagnosis method performed by the diagnosis device 10 is completed.

As described above, in the diagnosis device 10, the strain estimation device 20, and the strain estimation method performed by the strain estimation device 20, the pressure signal $\{p_n'\}$ including the time-series pressure values $p_n'$ at the predetermined position in the vicinity of the inducer 2 is converted into the strain signal $\{\varepsilon_n'\}$ including the time-series strain values $\varepsilon_n'$ occurring at the inducer 2 using the estimation filter. Although a linear correlation between the pressure value at the predetermined position in the vicinity of the inducer 2 and the strain value occurring at the inducer 2 has not been clearly recognized, a correlation between the power spectral density of pressure at the predetermined position in the vicinity of the inducer 2 and the power spectral density of strain occurring at the inducer 2 has been found. Thus, it is possible to convert the pressure signal $\{p_n'\}$ into the strain signal $\{\varepsilon_n'\}$ using the estimation filter determined based on the relationship between the power spectral density of pressure and the power spectral density of strain. For this reason, since the strain signal $\{\varepsilon_n'\}$ is estimable using the pressure signal $\{p_n'\}$, it is possible to acquire the strain occurring at the inducer 2 without using a strain gauge.

In addition, the diagnosis device 10 calculates a stress signal $\{s_n\}$ including time-series stress values $s_n$ applied to the inducer 2 based on the strain signal $\{\varepsilon_n\}$ output from the strain estimation device 20, and calculates the accumulated fatigue-damage degree D of the inducer 2 based on the stress signal $\{s_n\}$. The strain estimation device 20 is capable of acquiring the strain occurring at the inducer 2, and which enables the diagnosis device 10 to acquire the accumulated fatigue-damage degree D of the inducer 2 without using a strain gauge.

Furthermore, by using the estimation filter, it is possible to reduce the calculation load for converting the pressure signal $\{p_n\}$ into the strain signal $\{\varepsilon_n\}$. Thus, it is possible for the strain estimation device 20 to estimate the strain signal $\{\varepsilon_n\}$ from the pressure signal $\{p_n\}$ in real time. As a result, it is possible for the diagnosis device 10 to calculate the accumulated fatigue-damage degree D in real time.

In addition, by removing the offset from the pressure signal $\{p_n\}$, it is possible to extract the pressure signal $\{p_n'\}$ which is a fluctuation component of the pressure signal $\{p_n\}$. By using this pressure signal $\{p_n'\}$, it is possible to improve the accuracy of the conversion from the pressure signal $\{p_n'\}$ into the strain signal $\{\varepsilon_n'\}$. Then, by recovering the offset of the strain signal $\{\varepsilon_n'\}$, the strain signal $\{\varepsilon_n\}$ in which the offset has been recovered is obtained, and it is possible to improve the accuracy of the estimation of the strain occurring at the inducer 2.

An embodiment of the present disclosure has been described above, but the present invention is not limited to the above embodiment. For example, the diagnosis target is not limited to the inducer 2 of the turbo pump of the rocket 1, and only has to be a component that receives stress in a fluid. Other examples of the diagnosis target are, for example, a turbine blade of a turbo pump of a spacecraft, a blade of a steam turbine, a heat exchanger (piping vibration) used for nuclear power generation, and an inducer of a general industrial pump.

The diagnosis device 10 may further include a determination unit that determines an abnormality of the inducer 2 based on the accumulated fatigue-damage degree D calculated by the accumulated-fatigue-damage-degree calculation unit 28. For example, the determination unit compares a predetermined threshold value with the accumulated fatigue-damage degree D to determine whether the inducer 2 is abnormal. Specifically, the determination unit may determine that the inducer 2 is abnormal when the accumulated fatigue-damage degree D is greater than the threshold value, and that the inducer 2 is normal when the accumulated fatigue-damage degree D is equal to or less than the threshold value. The determination unit may output a determination result indicating whether the inducer 2 is abnormal or normal.

Furthermore, the strain estimation device 20 may not include the offset removal unit 23 and the offset recovery unit 25. In this case, the estimation unit 24 estimates the strain signal $\{\varepsilon_n\}$ based on the pressure signal $\{p_n\}$ acquired by the pressure acquisition unit 22, and outputs the strain signal $\{\varepsilon_n\}$ to the output unit 26.

INDUSTRIAL APPLICABILITY

According to the strain estimation device, the diagnosis device, and the strain estimation method of the present disclosure, it is possible to acquire strain without using a strain gauge.

REFERENCE SIGNS LIST

2 Inductor (component)
4 Pressure sensor
10 Diagnosis device
20 Strain estimation device
21 Operating-point-information acquisition unit
22 Pressure acquisition unit
23 Offset removal unit
24 Estimation unit
25 Offset recovery unit
26 Output unit
27 Stress calculation unit
28 Accumulated-fatigue-damage-degree calculation unit
F Liquid fuel (fluid)

The invention claimed is:

1. A strain estimation device that estimates strain of a component provided in a fluid without using a strain gauge, the strain estimation device comprising:
    an operating-point-information acquisition unit configured to acquire pressure and temperature measured by a sensor that is disposed at an upstream position of the fluid, a flow rate of the fluid, and rotational speed of the component as operating-point information;
    a pressure acquisition unit configured to acquire a pressure signal including time-series pressure values at a predetermined position in a vicinity of the component;
    an offset removal unit configured to remove offset from the pressure signal;
    an estimation unit configured to estimate, based on the pressure signal from which the offset has been removed, a strain signal including time-series strain values occurring at the component;
    an offset recovery unit configured to recover offset of the strain signal based on the operating-point information; and
    an output unit configured to output the strain signal in which the offset has been recovered, wherein
    the estimation unit converts the pressure signal from which the offset has been removed into the strain signal using an estimation filter determined based on a power spectral density of pressure and a power spectral density of strain occurring at the component when the pressure is applied to the position.

2. A diagnosis device that diagnoses an accumulated fatigue-damage degree of the component, the diagnosis device comprising:
    the strain estimation device according to claim 1;
    a stress calculation unit configured to calculate, based on the strain signal output from the strain estimation device, a stress signal including time-series stress values applied to the component; and
    an accumulated-fatigue-damage-degree calculation unit configured to calculate the accumulated fatigue-damage degree of the component based on the stress signal.

3. A strain estimation method performed by a strain estimation device that estimates strain of a component provided in a fluid without using a strain gauge, the strain estimation method comprising:
    an operating-point-information acquisition step of acquiring pressure and temperature measured by a sensor that is disposed at an upstream position of the fluid, a flow rate of the fluid, and rotational speed of the component as operating-point information;
    a pressure acquisition step of acquiring a pressure signal including time-series pressure values at a predetermined position in a vicinity of the component;
    an offset removal step of removing offset from the pressure signal;
    an estimation step of estimating, based on the pressure signal from which the offset has been removed, a strain signal including time-series strain values occurring at the component;
    an offset recovery step of recovering offset of the strain signal based on the operating-point information; and
    an output step of outputting the strain signal in which the offset has been recovered, wherein
    the pressure signal from which the offset has been removed is converted into the strain signal in the estimation step using an estimation filter determined based on a power spectral density of pressure and a power spectral density of strain occurring at the component when the pressure is applied to the position.

* * * * *